US006055851A

United States Patent [19]

Tanaka et al.

[11] Patent Number: 6,055,851

[45] Date of Patent: May 2, 2000

[54] APPARATUS FOR DIAGNOSING FAILURE OF HYDRAULIC PUMP FOR WORK MACHINE

[75] Inventors: Yasuo Tanaka, Tsukuba; Masami Ochiai, Atsugi; Takashi Yagyu, Ushiku; Akira Hashimoto, Tsuchiura; Yoshinori Furuno, Tsuchiura; Yutaka Watanabe, Tsuchiura; Yukihiko Sugiyama, Tsuchiura, all of Japan

[73] Assignee: Hitachi Construction Machinery Co., Ltd., Tokyo, Japan

[21] Appl. No.: 09/051,440

[22] PCT Filed: Aug. 7, 1997

[86] PCT No.: PCT/JP97/02771

§ 371 Date: Sep. 3, 1998

§ 102(e) Date: Sep. 3, 1998

[87] PCT Pub. No.: WO98/06946

PCT Pub. Date: Feb. 19, 1998

[30] Foreign Application Priority Data

Aug. 12, 1996 [JP] Japan .................................... 8-212779
Aug. 12, 1996 [JP] Japan .................................... 8-212780

[51] Int. Cl.[7] ...................................................... G01M 3/00

[52] U.S. Cl. .................................... 73/46; 73/40; 73/49.7

[58] Field of Search .................................... 73/37, 39, 40, 73/46, 49.7, 118.1, 865.9

[56] References Cited

U.S. PATENT DOCUMENTS 5,186,000 2/1993 Hirata et al. ............................. 60/420
5,289,679 3/1994 Yasuda ..................................... 60/422
5,295,795 3/1994 Yasuda et al. .......................... 417/213

*Primary Examiner*—Eric S. McCall
*Attorney, Agent, or Firm*—Evenson, McKeown, Edwards & Lenahan, P.L.L.C.

[57] ABSTRACT

This invention relates to a fault diagnosis system for hydraulic pumps in a work vehicle, which is economical and permits sure identification of one or more trouble-developed ones of the hydraulic pumps.

Pressure sensors 61–64 are arranged on pressurized fluid lines 30,40, which extend to a tank T from points immediately out of center bypasses of flow control valves 21,231–234,451–454,26 communicated to hydraulic pumps 1–6. Solenoid-operated directional control valves 51–56 are interposed in input circuits of individual regulators 11–16 so that, upon excitation, a pressure of a pilot pump 7 is introduced into the regulators 11–16. When all the flow control valves are brought into neutral positions thereof and a determination is instructed through a switch 80, one of the solenoid-operated directional control valves is excited by a signal from a processor 70 so that pressurized fluid is delivered at a maximum flow rate from the corresponding hydraulic pump. A detection value of the corresponding pressure sensor at this time is translated into a flow rate, which is then stored. These procedures are performed with respect to the individual hydraulic pumps successively. Based on a flow rate obtained in every determination, a fault diagnosis of the corresponding particular hydraulic pump is performed.

10 Claims, 10 Drawing Sheets

APPARATUS FOR DIAGNOSING FAILURE OF HYDRAULIC PUMP FOR WORK MACHINE

BACKGROUND OF THE INVENTION

This invention relates to a fault diagnosis system for hydraulic pumps in a work vehicle equipped with a plurality of variable displacement hydraulic pumps as the hydraulic pumps and adapted to perform work by driving a plurality of hydraulic actuators. The fault diagnosis system determines whether each of the variable displacement hydraulic pumps is operating properly or not operating properly.

A work vehicle such as a hydraulic excavator performs given work by driving a hydraulic pump with an engine and driving a hydraulic actuator with pressurized fluid delivered from the hydraulic pump. Development of a trouble in the hydraulic pump therefore causes a serious problem or inconvenience for the work by the work vehicle. It is hence important to determine whether the hydraulic pump is operating properly or not operating properly and, if a trouble is determined to have been developed, to promptly carry out a repair such as replacement of a component so that the problem or inconvenience for the work can be minimized. Determination as to whether a hydraulic pump is operating properly or not operating properly (a fault diagnosis) has heretofore been effected by measuring with a flow meter a flow rate of pressurized fluid delivered from the hydraulic pump and checking whether or not the flow rate falls within a predetermined range.

Examples of the flow meter include a turbine flow meter, an oval flow meter, a flow meter making use of a Pitot tube, and a flow mater disclosed in Japanese Patent Application No. SHO 63-113434 and adapted to detect a displacement of a poppet valve. These flow meters are all accompanied by problems that they are complex in structure, high in price and poor in vibration resistance. Accordingly, mounting of such a flow meter on a small hydraulic pump installed at a slightly-vibrated place is feasible, but mounting of such a flow meter on a hydraulic pump of a work machine subjected to large vibrations such as a hydraulic excavator is practically infeasible. It is therefore the current circumstances that, concerning a hydraulic pump of a work vehicle subjected to large vibrations, a predetermined use period is set for each of components making up the hydraulic pump and the component is replaced by a corresponding new component at a suitable time after expiration of the use period.

The use period is however set with a substantial allowance, so that the component can be used for a further period without replacement in many instances. The above-mentioned practice of component replacement is hence not preferred from the viewpoint of economy and also from the viewpoint of labor and time required for the component replacement. Described specifically, a large hydraulic excavator is generally equipped with many hydraulic pumps, and pressurized fluids delivered from two of the hydraulic pumps are combined to drive a hydraulic actuator. If any one of these hydraulic pumps develops a trouble, an operator can become aware of the development of the trouble by a change in the actuation speed of the associated hydraulic actuator. When the hydraulic actuator is driven by combining pressurized fluids delivered from two hydraulic pumps, it is impossible to determine which one of the hydraulic pumps has developed a trouble even when development of a trouble on the side of the hydraulic pumps is found from a change in the actuation speed of the hydraulic actuator. To determine which one of the hydraulic pumps has developed the trouble, it is necessary to suspend the operation of the large hydraulic excavator and then to inspect the above-mentioned trouble. This operation suspension of the large hydraulic excavator however leads to a significant reduction in the efficiency of the work.

An object of the present invention is therefore to provide a fault diagnosis system for hydraulic pumps in a work vehicle, which can overcome the above-described problems of the conventional art, does not use flowmeters, is economical, and permits sure identification of one or more trouble-developed ones of the hydraulic pumps.

SUMMARY OF THE INVENTION

To achieve the above-described object, the invention of claim 1 provides a fault diagnosis system for hydraulic pumps in a work vehicle, said work vehicle being provided with a plurality of variable displacement hydraulic pumps as the hydraulic pumps, delivery rates of which are controlled by regulators, a plurality of hydraulic actuators each of which is driven by pressurized fluid delivered from at least one of the variable displacement hydraulic pumps, a plurality of flow control valves for controlling driving of the individual hydraulic actuators, and a pressurized fluid line for communicating the at least one variable displacement hydraulic pump to a tank via at least one of the flow control valves, said at least one flow control valve being in a neutral position thereof, wherein the fault diagnosis system comprises a pressure sensor arranged on the line for detecting a fluid pressure in the pressurized fluid line, maximum delivery rate designation means for successively designating maximum delivery rates of the variable displacement hydraulic pumps to corresponding ones of the regulators while the at least one variable displacement hydraulic pump is maintained in communication with the pressurized fluid line, memory means for storing a detection value by the pressure sensor with respect to each of the variable displacement hydraulic pumps, said each variable displacement hydraulic pump delivering the pressurized fluid at the maximum flow rate designated by the maximum delivery rate designation means, and fault determination means for performing on a basis of detection values by the pressure sensor a determination as to whether the variable displacement hydraulic pump for which the maximum delivery rate has been designated is operating properly or not operating properly.

Further, the invention of claim 2 is characterized in that, in place of the means for performing a determination on the basis of a detection value of the pressure sensor in the above-described invention of claim 1, pressure-flow rate translation means for translating a detection value of the pressure sensor into a corresponding flow rate is arranged and a determination is performed, based on the flow rate translated by the pressure-flow rate translation means, as to whether the variable displacement hydraulic pump the maximum delivery rate of which has been designated is operating properly or not operating properly.

In addition, the invention of claim 6 provides a fault diagnosis system for hydraulic pumps in a work vehicle, said work vehicle being provided with a plurality of variable displacement hydraulic pumps as the hydraulic pumps, delivery rates of which are controlled by regulators, a plurality of hydraulic actuators each of which is driven by pressurized fluid delivered from at least one of the variable displacement hydraulic pumps, a plurality of flow control valves for controlling driving of the individual hydraulic actuators, and a pressurized fluid line for communicating the at least one variable displacement hydraulic pump to a tank via at least one of the flow control valves, said at least one flow control valve being in a neutral position thereof, wherein the fault diagnosis system comprises check valves provided with differential pressure sensors and interposed between the respective variable displacement hydraulic pumps and corresponding ones of the flow control valves, maximum delivery rate designation means for designating maximum delivery rates of the variable displacement hydraulic pumps to corresponding ones of the regulators while the at least one variable displacement hydraulic pump is maintained in communication with the pressurized fluid line, memory means for storing a pressure detected by the check valve provided with the differential pressure sensor with respect to each of the variable displacement hydraulic pump, said each variable displacement hydraulic pump delivering the pressurized fluid at the maximum flow rate designated by the maximum delivery rate designation means, and fault determination means for performing on a basis of the detection values a determination as to whether the variable displacement hydraulic pump for which the maximum delivery rate has been designated is operating properly or not operating properly.

Furthermore, the invention of claim 7 is characterized in that, in place of the means for performing a determination on the basis of the detection pressure in the above-described invention of claim 6, pressure-flow rate translation means for translating the detection pressure into a corresponding flow rate is arranged and a determination is performed, based on the flow rate translated by the pressure-flow rate translation means, as to whether each of the variable displacement hydraulic pumps is operating properly or not operating properly.

DESCRIPTION OF THE PREFERRED EMBODIMENTS

First, the first embodiment of the present invention will be described with reference to FIG. 1 through FIG. 8.

Figure 1:
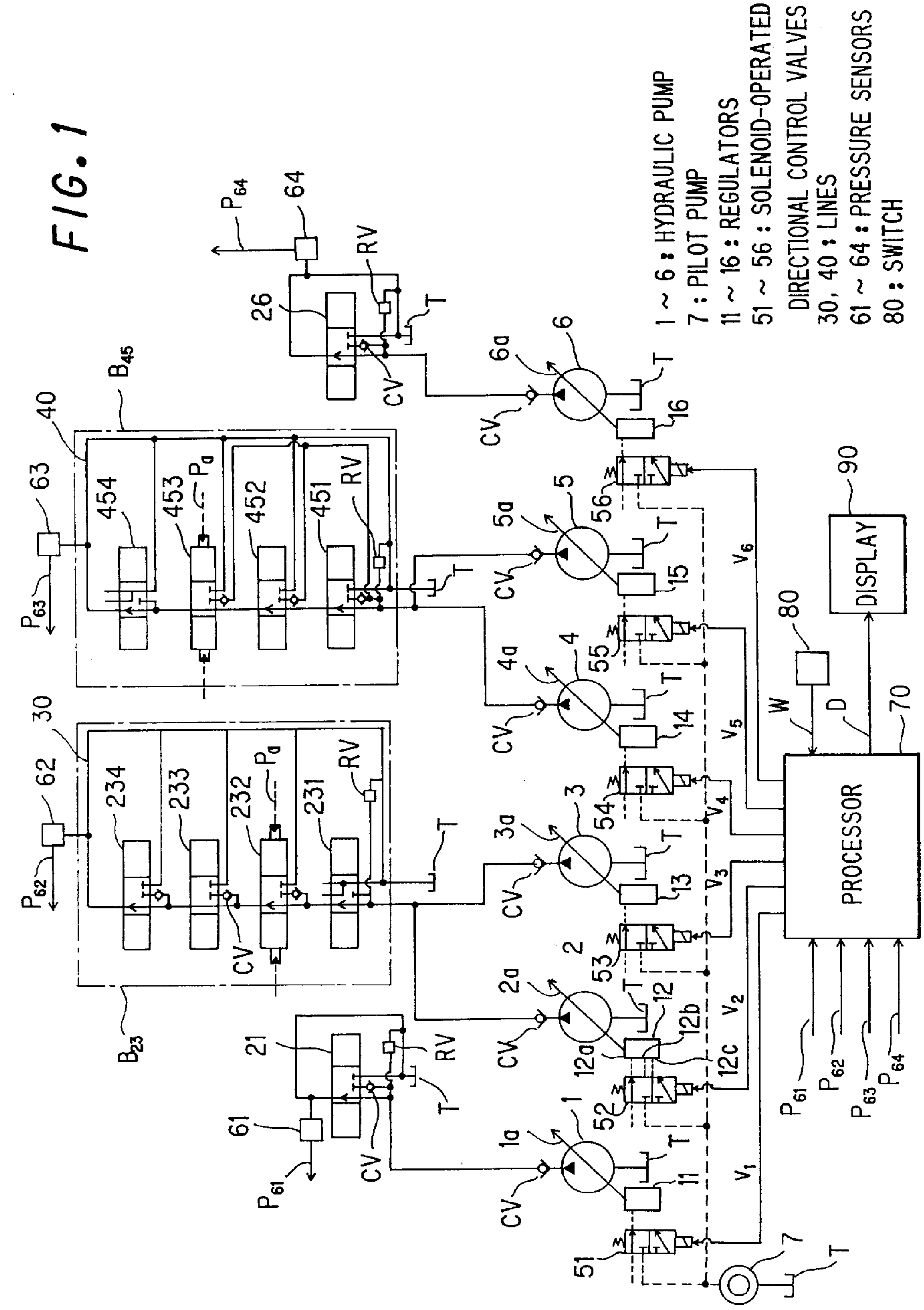
FIG. 1 is a diagram showing a fault diagnosis system according to a first embodiment of the present invention for hydraulic pumps in a large hydraulic excavator.

FIG. 1 is the diagram showing the fault diagnosis system according to this embodiment of the present invention for the hydraulic pumps in the large hydraulic excavator. In the diagram, there are illustrated variable displacement pumps (hereinafter simply referred to as "hydraulic pumps") 1–6, a pilot pump 7, displacement varying mechanisms (hereinafter called "swash plates" as typical examples) 1*a*–6*a* for the respective hydraulic pumps, regulators 11–16 for controlling tiltings of the individual swash plates 1*a*–6*a*, in other words, delivery flow rates of the individual hydraulic pumps 1–6, a tank T, check valves CV, and relief valves RV. The hydraulic pumps 1–3 are driven by an unillustrated first motor (engine), while the hydraulic pumps 4–6 are driven by an unillustrated second motor (engine). Incidentally, the hydraulic pumps 2–5 are hydraulic pumps of the same displacement, and the hydraulic pumps 1,6 are hydraulic pumps of the same displacement which is different from the first-mentioned same displacement.

Designated at numerals 21,26 are flow control valves for controlling swing motors. These flow control valves are communicated to the hydraulic pumps 1,6 and are equipped with center bypasses, respectively. Also illustrated are a valve block $B_{23}$ in which pressurized fluids from the hydraulic pumps 2,3 are combined together and a valve block $B_{45}$ in which pressurized fluids from the hydraulic pumps 4,5 are combined together. The valve block $B_{23}$ is constructed of flow control valves 231–234, which are communicated in tandem, and a pressurized fluid line 30, whereas the valve block $B_{45}$ is constructed of flow control valves 451–454, which are communicated in tandem, and a pressurized fluid line 40. In the valve block $B_{23}$, the flow control valve 231 is a valve for controlling a drive motor, the flow control valve 232 is a valve for controlling a boom cylinder and a bucket cylinder, the flow control valve 233 is a spare valve, and the flow control valve 234 is a valve for controlling an arm cylinder. In the valve block $B_{45}$, the flow control valve 451 is a valve for controlling the arm cylinder, the flow control valve 452 is a valve for controlling the bucket cylinder, the flow control valve 453 is a valve for controlling the boom cylinder, and the flow control valve 454 is a valve for controlling the drive motor. The individual flow control valves are equipped with center bypass circuits and, when the flow control valves 231–234 are all brought into neutral positions in the valve block $B_{23}$, the hydraulic pumps 2,3 are communicated to the pressurized fluid line 30 via the center bypass circuits of the individual flow control valves 231–234 and further to the tank T through the pressurized fluid line 30. Likewise, when the flow control valves 451–454 are all brought into the neutral positions in the valve block $B_{45}$, the hydraulic pumps 4,5 are communicated to the pressurized fluid line 40 via the center bypass circuits of the individual flow control valves 451–454 and further to the tank T through the pressurized fluid line 40.

In the above-described hydraulic circuit, when an operator of the hydraulic excavator operates, for example, an unillustrated boom control lever in order to raise the boom, a pilot pressure $P_a$ which is proportional to a stroke of the control lever is applied to command input ports of the flow control valve 232 and flow control valve 453, said command input ports being on right sides as viewed in the diagram, and these flow control valves 232,453 are switched into right positions, so that pressurized fluids from the hydraulic pumps 2,3,4,5 are combined and are allowed to flow into a bottom side of the unillustrated boom cylinder. A rod of the boom cylinder is hence caused to extend, whereby the boom is driven in a rising direction. Incidentally, another command input port of the flow control valve 232, said command input port being on a left side as viewed in the diagram, is a bucket-tilting port, and another command input port of the flow control valve 453, said command input port being on a left side as viewed in the diagram, is a boom-lowering port.

Figure 2:
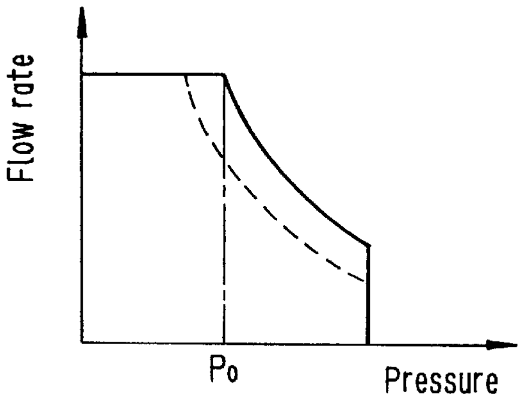
FIG. 2 is a characteristic diagram of a relationship between delivery pressures and delivery flow rates of each hydraulic pump depicted in FIG. 1.

On the other hand, command signals are inputted to the individual regulators 11–16 during operation of the respective hydraulic pumps 1–6, whereby the tiltings of the swash plates 1*a*–6*a* are controlled to govern the delivery flow rates of the individual hydraulic pumps 1–6. This control will be described with reference to the pressure-flow rate characteristic diagram shown in FIG. 2. In FIG. 2, delivery pressures of the hydraulic pump are plotted along the abscissa, and delivery flow rates of the hydraulic pump are plotted along the ordinate. Concerning command signals to the regulators, a description will be made by taking the regulator 12 as an example. The following description also applies equally to the command signals to the other regulators.

The regulator 12 has command signal input ports 12*a*, 12*b*, 12*c*. It is to be noted that illustration of command signal input ports of the other regulators, said command signal input ports corresponding to the command signal input ports 12*a*, 12*b*, 12*c*, are omitted in the diagram. To the command signal input port 12*a*, the maximum pressure out of pilot control pressures applied to the individual flow control valves in the valve block $B_{23}$ is inputted, whereby the swash plate 2*a* is controlled in such a direction that the delivery flow rate is increased (this command signal input port will be called the "control signal input port"). To the command signal input port 12*b*, a delivery pressure of the hydraulic pump 2 is inputted in many instances, and the swash plate 2*a* is controlled in such a direction that, as is indicated by a solid curve in FIG. 2, the delivery flow rate is lowered with changes approximately similar to a hyperbola when the delivery pressure reaches a predetermined level or higher. To the command signal input port 12*c*, a signal is inputted to make a parallel shift of the pressure-flow rate characteristics as indicated by a dashed curve in FIG. 2.

The above-described construction is known for hydraulic circuits as disclosed, for example, in JP kokoku 62-28318 and JP kokoku 1-25906. A description will next be made of a construction added to the abovedescribed hydraulic circuit for performing a fault diagnosis in accordance with this embodiment. Numerals 51–56 indicate solenoid-operated directional control valves, which are normally set in upper positions by springs shown in the diagram and are switched into lower positions upon input of electrical signals (which are indicated by $V_1$–$V_6$). When the individual solenoid-operated directional control valves 51–56 are in the upper positions, command signals in normal operation are inputted to the control signal input ports of the respective regulators 11–16. When switched into the lower positions, a pilot pressure of the pilot pump 7 is inputted so that the delivery flow rates of the corresponding hydraulic pumps are maximized. Numeral 61 indicates a pressure sensor arranged on a pressurized fluid line between an outlet of the center bypass circuit of the flow control valve 21 and the tank T, numeral 62 indicates a pressure sensor arranged on the pressurized fluid line 30, numeral 63 indicates a pressure sensor arranged on the pressurized fluid line 40, and numeral 64 indicates a pressure sensor arranged on a pressurized fluid line between an outlet of the center bypass circuit of the flow control valve 26 and the tank T. Detection signals of the individual pressure sensors 61–64 are designated by signs $P_{61}$–$P_{64}$. There are also shown a processor 70 composed of a computer and adapted to determine a fault of each hydraulic pump (details of which will be described subsequently herein), a switch 80 for commanding initiation of a determination to the processor 70, and a display 90 for displaying data of the determination.

Figure 3:
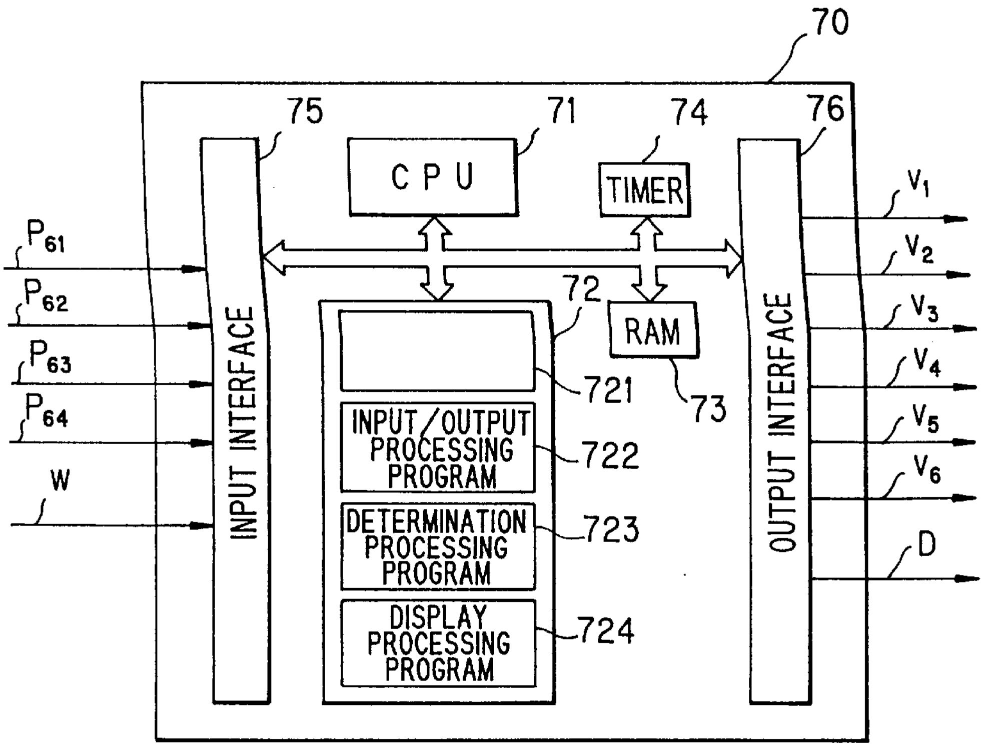
FIG. 3 is a system configuration diagram of a processor depicted in FIG. 1.

FIG. 3 is the system configuration diagram of the processor depicted in FIG. 1. This diagram shows a central processing unit (CPU) for performing computation and control as required, a read-on memory (ROM) 72 in which control programs and the like for CPU 71 are stored, a random access memory (RAM) 73 in which measurement results, determination results and the like are stored temporarily, a timer 74 for outputting time signals, an input interface 75 equipped with an A/D converter and adapted to input detection pressure signals $P_{61}$–$P_{64}$ of the pressure sensors 61–64 and a determination start signal w of the switch 80, and an output interface 76 equipped with a D/A converter and adapted to output signals $V_1$–$V_6$ to the corresponding solenoid-operated directional control valves 51–56 and display data D to the display 90. ROM 72 has an area 721 in which a translation table, which will be described subsequently herein, necessary numerical values and the like are stored, another area 722 with an input/output processing program stored therein, a further area 723 with a determination processing program stored therein, and a still further area 724 with a display processing program stored therein.

Figure 4:
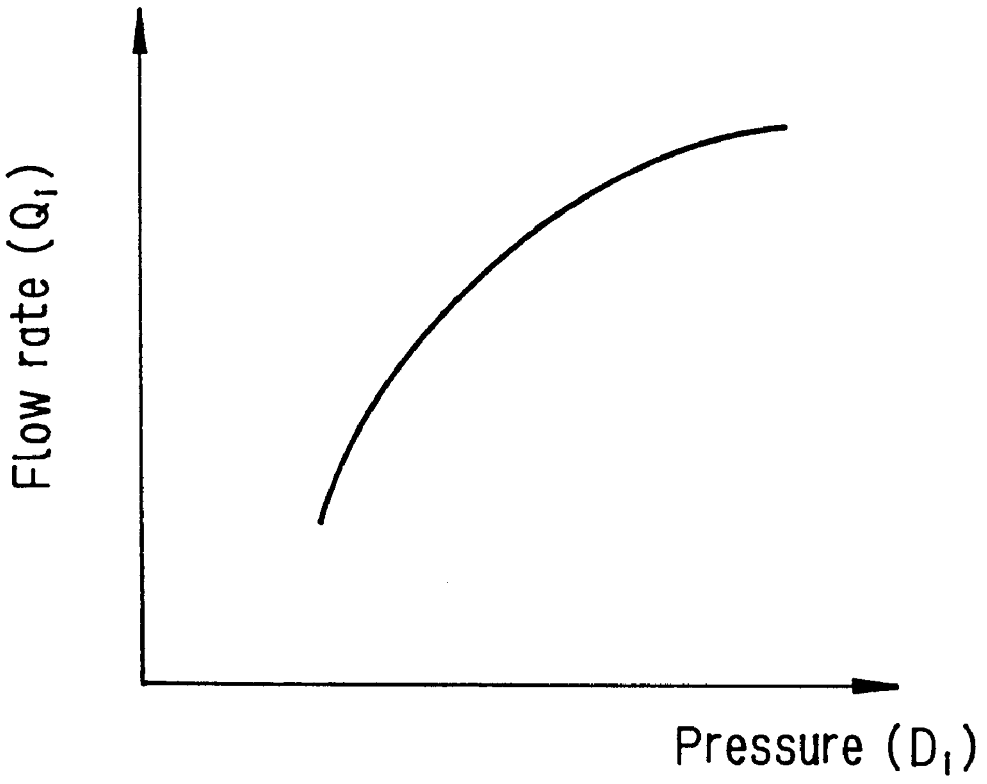
FIG. 4 is a characteristic diagram of a translation table between detection pressures of each pressure sensor depicted in FIG. 1 and flow rates.

FIG. 4 is the diagram showing the translation table stored in the area 721 of ROM 72 depicted in FIG. 3. In this diagram, detection pressures of each pressure sensor 61–64 shown in FIG. 1 are plotted along the abscissa, while their corresponding flow rates are plotted along the ordinate. This translation table can be prepared as will be described next. Namely, it can be prepared by newly arranging a hydraulic pump, flow control valves communicated together in tandem, and a pressurized fluid line extending from the flow control valve in the final stage to a tank (said pressurized fluid line being equivalent to the pressurized fluid lines 30,40 in FIG. 1), interposing a flowmeter in a delivery port of the hydraulic pump, connecting a pressure sensor to the pressurized fluid line, and then measuring a relationship between delivery flow rates of the hydraulic pump and their corresponding detection pressures of the pressure sensor. When a translation table is prepared in this manner, a fault diagnosis is performed by setting the delivery flow rate of the hydraulic pump at the maximum flow rate as will be described subsequently herein so that it is sufficient for the translation table to define a flow rate-pressure relationship only in a large flow rate range. Further, when all the hydraulic pumps shown in FIG. 1 are new, it is also possible to prepare a translation table by plotting a point on the basis of a rated flow rate of the hydraulic pumps and a detection value of a hydraulic sensor and then using the point and a pressurized fluid line resistance which is known beforehand. As a further alternative, a table showing a relationship between pressures and flow rates may also be prepared by empirically determining beforehand line resistances of the respective pressurized fluid lines illustrated in FIG. 1.

Figure 5:
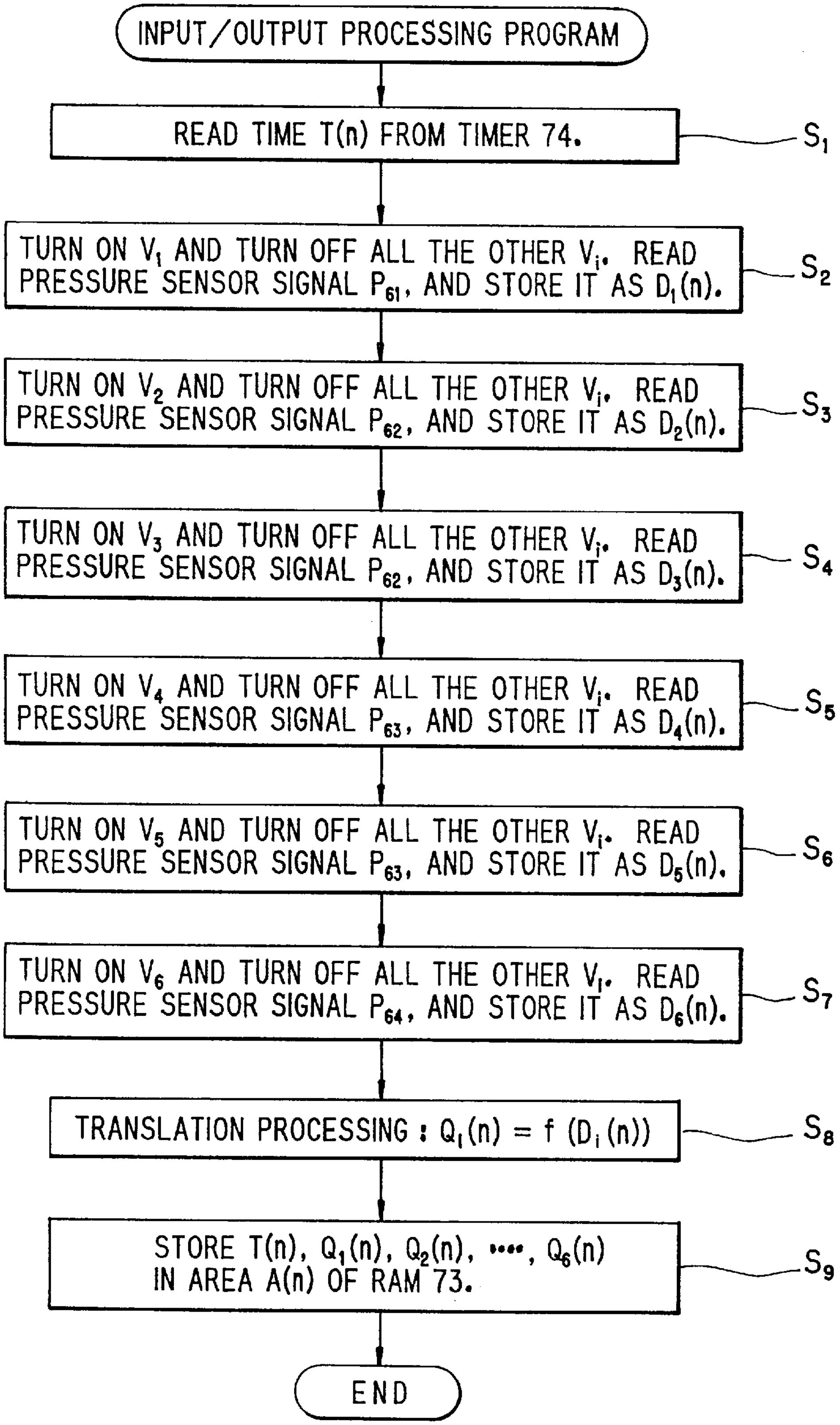
FIG. 5 is a flow chart illustrating an operation by the processor depicted in FIG. 1.
Figure 6:
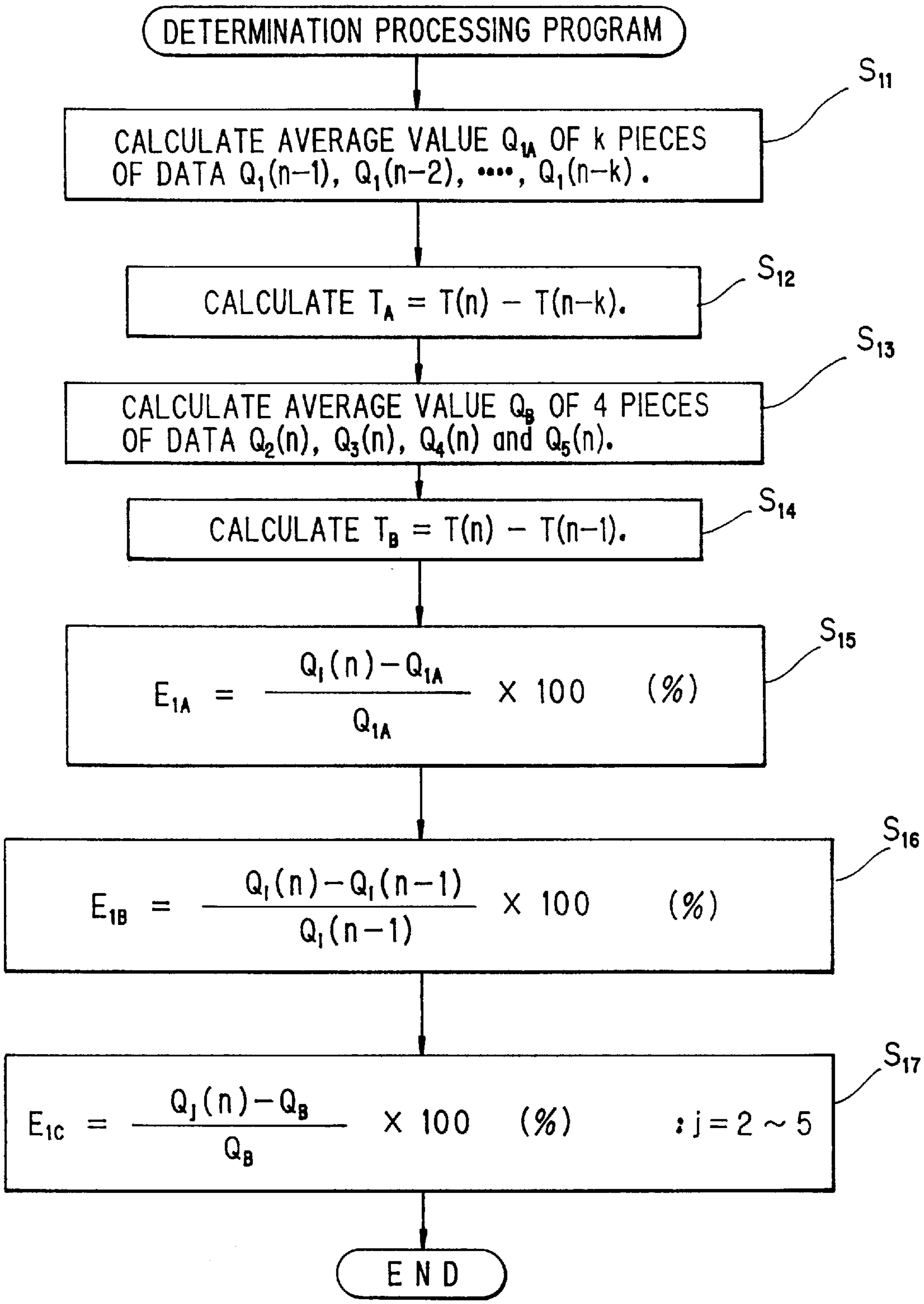
FIG. 6 is a flow chart illustrating another operation by the processor depicted in FIG. 1.
Figure 7:
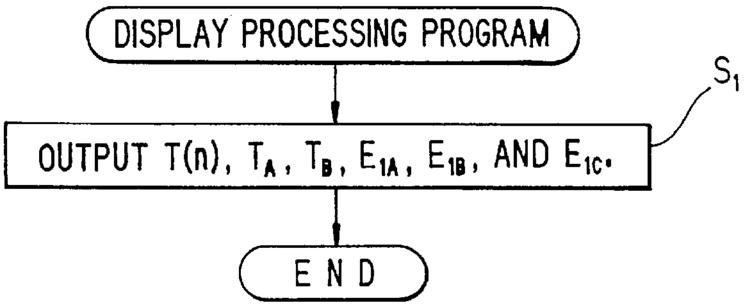
FIG. 7 is a flow chart illustrating a further operation by the processor depicted in FIG. 1.

Next, operation of this embodiment will be described with reference to the flow charts shown in FIG. 5, FIG. 6 and FIG. 7. A fault diagnosis can be performed at any time by turning on the switch 80. Incidentally, a large hydraulic excavator often performs work of about 8 hours or so in straight including rest periods in the course of the work. In the case of such work, it is desired for the operator of the hydraulic excavator to operate the switch 80 at the time of completion of the work or at the time of a work shift to the next operator. Upon operation of the switch, the switch 80 is turned on with the speed of the engine as the motor maintained at a maximum level and also with all the control levers set in neutral positions. As a consequence, a signal w from the switch 80 is read in CPU 71 via the input interface 75 of the processor 70 and the input/output processing program stored in the area 722 of ROM 72 is activated firstly. Processing steps of this input/output processing program will be described with reference to FIG. 5.

Firstly, CPU 71 reads a current time T(n) from the timer 74 (step $S_1$). Incidentally, n represents the number of processings in step $S_1$. CPU 71 then turns on a signal $V_1$ for the solenoid-operated directional control valve 51 and turns off signals for the other solenoid-operated directional control valves 52–56. As a result, the solenoid-operated directional control valve 51 is switched into the lower position, a pressure of the pilot pump 7 is introduced into the control signal input port of the regulator 11, the swash plate 1*a* undergoes a maximum tilting, and the delivery flow rate of the hydraulic pump 1 reaches a maximum flow rate. Since the pressurized fluid line extending from the hydraulic pump 1 to the tank T has a pressurized fluid line resistance caused by the viscosity of working fluid, the fluid pressure in the pressurized fluid line on which the pressure sensor 61 is arranged at the output of the flow control valve 21 rises and this pressure is detected by the pressure sensor 61. CPU 71 reads a signal $P_{61}$ of the pressure sensor 61 and stores it in RAM 73 as pressure data $D_1$(n) for the maximum flow rate of the hydraulic pump 1 (step $S_2$).

Next, CPU 71 turns on a signal $V_2$ for the solenoid-operated directional control valve 52 and turns off signals for the other solenoid-operated directional control valves 51, 53–56. As a result, the solenoid-operated directional control valve 51 returns into the upper position and the solenoid-operated directional control valve 52 is switched into the lower position, a pressure of the pilot pump 7 is introduced into the control signal input port of the regulator 12, the swash plate 2*a* undergoes a maximum tilting, and the delivery flow rate of the hydraulic pump 2 reaches a maximum flow rate. In this case, the signal inputted into the control signal input port of the regulator 13 for the hydraulic pump 3 is 0 because all the control levers are in the neutral positions. The swash plate 3*a* therefore undergoes a minimum tilting and the delivery flow rate of the hydraulic pump 3 reaches a minimum flow rate which is close to 0. Accordingly, the pressurized fluid which is flowing through the center bypasses of the individual flow control valves and the pressurized fluid line 30 in the valve block $B_{23}$ is practically made up of the pressurized fluid delivered by the hydraulic pump 2. CPU 71 therefore stores a signal $P_{62}$ of the pressure sensor 62 in RAM 73 as pressure data $D_2$(n) for the maximum flow rate of the hydraulic pump 2 (step $S_3$). The same processing is performed likewise with respect to the hydraulic pumps 3–6 (steps $S_4$–$S_7$).

Next, CPU 71 translates the respective pressure data $D_i$(n) (i=1–6) into their corresponding flow rates $Q_i$(n) (i=1–6) by using the translation table shown in FIG. 4 and stored in the area 721 of ROM 72 (step $S_8$), and then stores the time T(n) and the respective flow rate $Q_1$–$Q_6$ in the area A(n) of RAM 73 (step $S_9$), whereby the input/output processing program is ended.

In the processing of the step $S_8$, each pressure was translated into its corresponding flow rate in accordance with the translation table stored in advance. It is however not absolutely necessary to rely upon such a translation table. Although the accuracy may be lowered somewhat, a flow rate corresponding to each pressure may be determined by performing the following operation instead of using the translation table.

$$Q_{i-ko} \cdot D_i$$

where $k_o$ is a predetermined factor.

When the input/output processing program is ended, the determination processing program stored in the area 723 of ROM 72 is next activated. Processing steps of this determination processing program will be described with reference to FIG. 6. Corresponding to the respective flow rates $Q_i$, CPU 71 fetches k pieces of flow rate data $Q_i$(n−1), $Q_i$(n−2), . . . , $Q_i$(n−k), which had been obtained up to the preceding determination, from the areas A(n−1), A(n−2), . . . , A(n−k) of RAM 73, respectively, and CPU 71 then calculates their average values $Q_{iA}$ (step $S_{11}$). Namely, average values $Q_{1A}$, $Q_{2A}$, . . . , $Q_{6A}$ of k pieces of flow rates of the individual hydraulic pumps 1–6, said flow rates having been obtained up to the preceding determination, are obtained.

Incidentally, the value k is set, for example, at such a value that about 100 hours or so have elapsed until the current determination. When, as mentioned above, operators are working on about 8-hour shifts and a determination is performed by each operator before each shift, the value k is set at 12 or 13 (100/8). CPU 71 then executes $T_A$=T(n)−T(n−k), that is, determines a calculation period $T_A$ for the average values $Q_{iA}$ (step $S_{12}$). Further, CPU 71 calculates an average value $Q_B$ of flow rates $Q_2$(n),$Q_3$(n),$Q_4$(n),$Q_5$(n) obtained in the current determination with respect to the hydraulic pumps 2,3,4,5 of the same displacement (step $S_{13}$). Next, a period $T_B$ for the average value $Q_B$ is computed [$T_B$=T(n)−T(n−1)] (step $S_{14}$)

By the way, the periods $T_A$,$T_B$ are both calculated based on the time of the timer 74. However, it is apparently better to calculate the periods $T_A$,$T_B$ by electrically measuring a time during which the engine is at a predetermined speed or higher or a time during which the hydraulic pumps are at a predetermined pressure or higher or at a predetermined flow rate or higher.

Next, CPU 71 executes the following operation:

$$E_{iA}=[Q_i(n)-Q_{iA}]\times 100/Q_{iA}\ (\%)$$

Namely, it is computed by how many percent the current $Q_i$ has increased or decreased relative to the average value $Q_{iA}$ for the past long period (step $S_{15}$), and the results of the computation are stored in RAM 73.

Further, the following computation is also executed:

$$E_{iB}=[Q_i(n)-Q_i(n-1)]\times 100/Q_i(n-1)\ (\%)$$

that is, it is computed by how many percent the current flow rate $Q_i$ has increased or decreased relative to the flow rate $Q_i$(n−1) obtained in the preceding determination (step $S_{16}$), and the results of the computation are stored in RAM 73.

In addition, the following computation is also executed:

$$E_{jc}=[Q_j(n)-Q_B]\times 100/Q_B\ (\%)\ (j=2,3,4,5)$$

Namely, it is computed by how many percents the individual current flow rates $Q_2$(n),$Q_3$(n),$Q_4$(n),$Q_5$(n) are different from the average value $Q_B$ (step $S_{17}$), and the results of the computation are stored in RAM 73. The determination processing program is now ended.

The above value $E_{iA}$ is a first determination reference value based on an average of flow rates of each hydraulic pump over a long time, the above value $E_{iB}$ is a second determination reference value based on a flow rate of each hydraulic pump in the preceding determination, and the above value $E_{jC}$ is a third determination reference value based on an average of flow rates of the hydraulic pumps of the same displacement at the current time point. The first determination reference value is suited for the determination of gradual changes in the performance of each hydraulic pump, the second determination reference value is effective for the determination of a sudden change in the performance of each hydraulic pump, which takes place within several hours or so, and the third determination reference value is effective for finding out any particular hydraulic pump which has indicated a significant difference through a mutual comparison among the hydraulic pumps of the same displacement.

Upon ending the determination processing program, the display processing program stored in the area 724 of ROM 72 is next activated. As is illustrated in FIG. 7, a processing step of this display processing program is to output the current time T(n) obtained by the input/output processing program and the determination processing program, the elapsed time $T_A$ during k determinations up to the preceding determination, the elapsed time $T_B$ from the preceding determination, the first determination reference value $E_{iA}$, the second determination reference value $E_{iB}$ and the third determination reference value $E_{jC}$ as data D (usually, serial signals) to the display 90 (step $S_{21}$).

Figure 8:
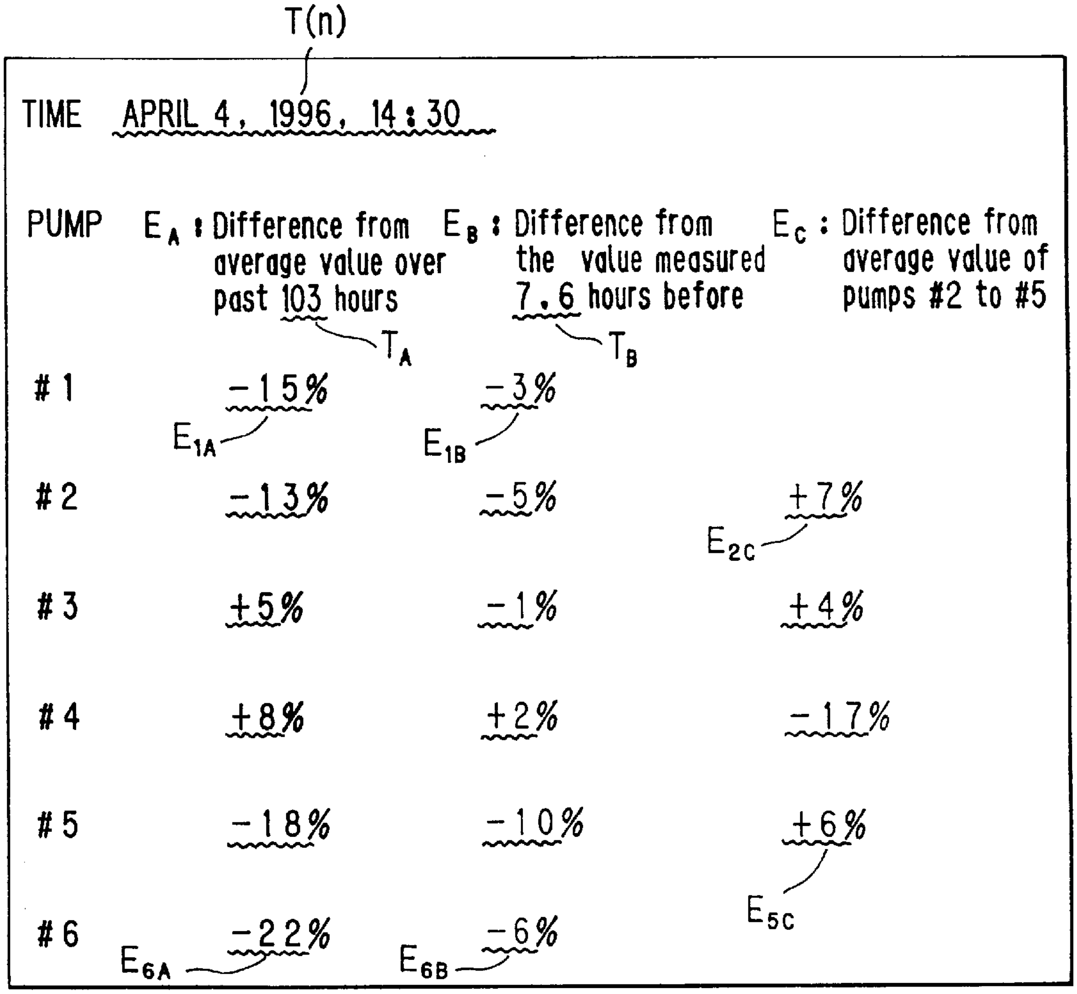
FIG. 8 is a diagram showing an illustrative display on a display depicted in FIG. 1.

FIG. 8 is the diagram showing the illustrative display on the display 90. Although not illustrated in any drawing, the display 90 is constructed of an input interface for inputting the data D outputted from the processor 70 and other necessary data, CPU, ROM, RAM, a character generator, an LCD driver, LCD, etc., and upon input of the data D, presents a display in response to the input, for example, in a form shown in FIG. 8. In FIG. 8, underlined parts are those subjected to changes depending of the inputted data D. According to the data D shown on this illustrative display, the current time T(n) is "Apr. 4, 1996, 14:30", the elapsed time $T_A$ during k determinations up to the preceding determination is "103 hours", the elapsed time from the preceding determination is "7.6 hours", the first determination reference value $E_{1A}$ for the hydraulic pump 1 is "−15%", the second determination reference value $E_{1B}$ for the same pump is "−3%", . . . , the third determination reference value $E_{2C}$ for the hydraulic pump 2 is "+7%", . . pressurized fluid . , the third determination reference value $E_{2C}$for the hydraulic pump 5 is "+6%", the first determination reference value $E_{6A}$ for the hydraulic pump 6 is "−22%", and the second determination reference value $E_{6B}$ for the same hydraulic pump is "−6%".

The operator of the hydraulic excavator watches the screen of the display 90 installed in the cab and determines whether or not any problem exists in each of the hydraulic pumps 1–6. For this determination, the scattering among the individual hydraulic pumps is assumed to be around several percent and, as a pressure loss which occurs when working fluid passes through each pressurized fluid line is readily affected by the temperature of the working fluid, an allowance of several tens percent is also taken into consideration with respect to the pressure loss. Under these premises, those adapted as reference values for the determination of whether each pump is out of order or not include, for example, about 20% as the first determination reference value $E_{iA}$, about 25% as the second determination reference value $E_{iB}$ with a view to avoiding making a wrong determination in a short time, and about 15% as the third determination reference value $E_{jC}$ in view of the possibility of a high accuracy as the hydraulic pumps are of the same displacement and the comparison is made at the same time and the same temperature.

As has been described above, according to this embodiment, the pressure sensors are arranged on the pressurized fluid lines extending out of the center bypasses of the individual flow control valves to the tank, and by operating the determination start switch, the delivery rate of one of the hydraulic pumps is set at the maximum flow rate and the flow rates of all the other hydraulic pumps are set at the minimum flow rates, whereby a detection value of the pressure sensor corresponding to the one hydraulic pump is collected. This detection value is then translated into a corresponding flow rate. These procedures are performed with respect to all the hydraulic pumps. The flow rates so collected in every determination are stored, and the flow rates obtained in the current determination are each compared with (1) the average value of the flow rates of the same hydraulic pump over the past long time, (2) the flow rate in the preceding determination, and (3) the average value of the flow rates of the hydraulic pumps of the same displacement in the current determination. It is therefore possible to surely perform a fault diagnosis with respect to each of the hydraulic pumps even when these hydraulic pumps are those of a work vehicle exposed to large vibrations and plural ones of the hydraulic pumps are used in combination.

Further, the pressure sensors are arranged on the pressured fluid lines through which working fluid is discharged to the tank so that pressure sensors for low pressures are sufficient. Coupled with the obviation of flow meters, the system can be constructed at low cost.

Compared with the method that each component is replaced upon expiration of its predetermined use time, each component can be used until shortly before the end of its service life. The efficiency of use of each component can therefore be improved, so that the system of this embodiment is extremely economical.

In addition, the accuracy of a determination can be made higher by repeating fault diagnoses in accordance with the present embodiment and accumulating data. It is hence possible to preview a fault at a stage substantially before the fault would otherwise occur, thereby making it possible to avoid the fault in advance.

In the above description of this embodiment, the hydraulic excavator was described by taking it as an example. Needless to say, the above embodiment can also be used for the fault diagnosis of hydraulic pumps in a work vehicle other than such a hydraulic excavator. Further, the description was made about the example in which one or more pressures detected by one or more pressure sensors were translated into one or more flow rates and a fault determination was performed based on the one or more flow rates. The translation of each pressure into a flow rate is however not absolutely needed, and a pressure detected by each pressure sensor may also be used as is. Further, transmission of the thus-obtained data to a supervision center of work vehicles makes it possible to perform a fault diagnosis at the supervision center instead of by the operator of the work vehicle.

In the above description of this embodiment, the description was made about the example in which how much the current value of each hydraulic pump was deviated from the three determination reference values, respectively, were displayed. It is however also possible to display the results of a comparison with the reference values or to display by using lamps or the like. According to the above description, the determination was performed at the end of every 8-hour shift by way of example. Without being limited to such an example, the determination can be performed at any time by setting the engine at a maximum speed or at a speed close to the maximum speed, bringing all the control levers into neutral positions, and operating the switch 80.

With reference to FIG. 9 through FIG. 13, the second embodiment of the present invention will next be described.

Figure 9:
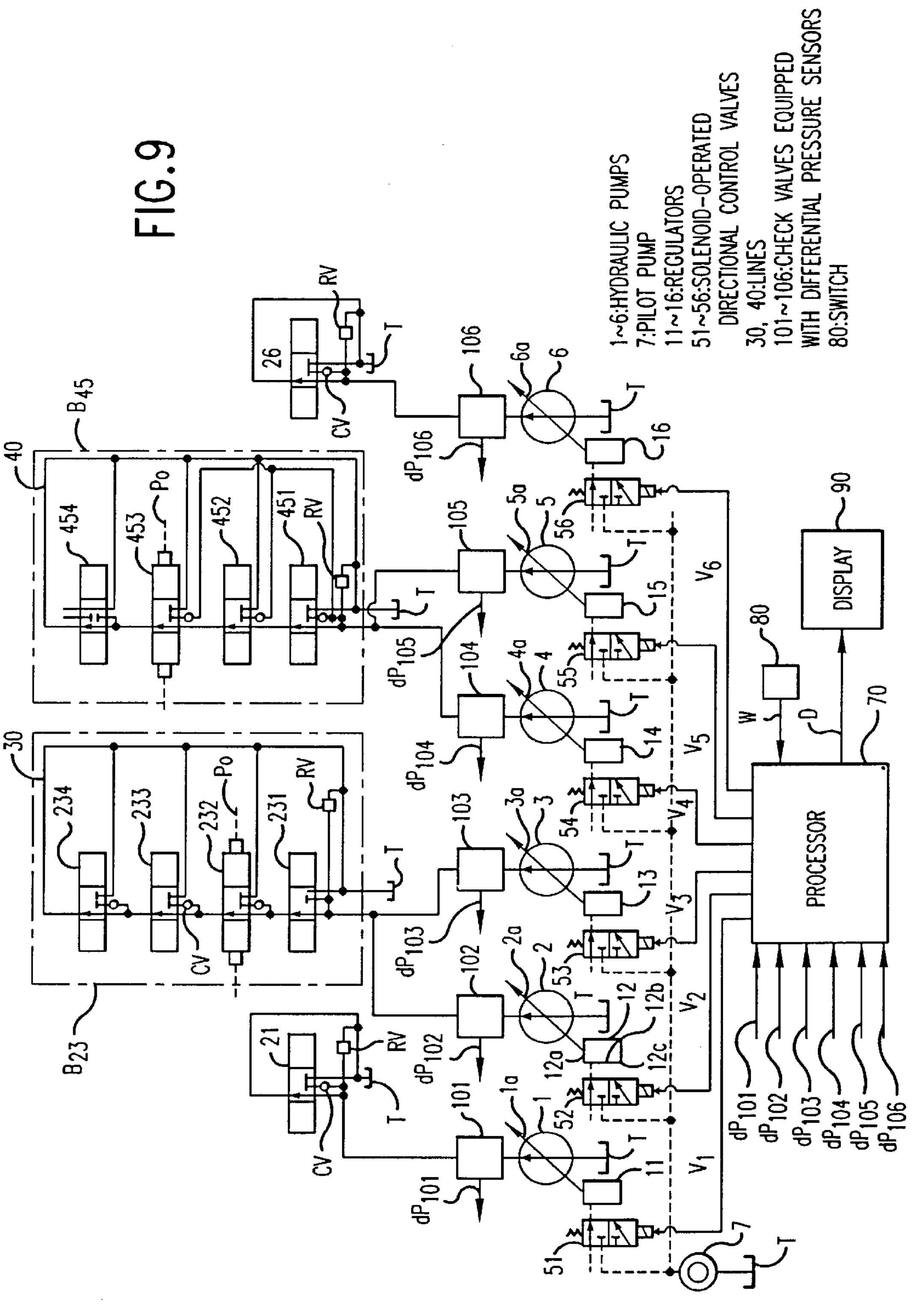
FIG. 9 is a diagram showing a fault diagnosis system according to a second embodiment of the present invention for hydraulic pumps in a large hydraulic excavator.

FIG. 9 is the diagram showing the fault diagnosis system according to the second embodiment of the present invention for the hydraulic pumps in the large hydraulic excavator. In this diagram, there are shown a check valve 101 equipped with a differential pressure sensor and arranged between the hydraulic pump 1 and the flow control valve 21, check valves 102,103 equipped with differential pressure sensors and arranged on upstream sides of a confluence point between the hydraulic pumps 2,3 and the valve block $B_{23}$, respectively, check valves 104,105 equipped with differential pressure sensors and arranged on upstream sides of a confluence point between the hydraulic pumps 4,5 and the valve block $B_{45}$, respectively, and a check valve 106 equipped with a differential pressure sensor and arranged between the hydraulic pump 6 and the flow control valve 26 (their details will be described subsequently herein).

Pressure detection means shown in FIG. 9 is different from that illustrated in FIG. 1 in that the DPS-equipped check valves 101–106 are arranged between the individual hydraulic pumps 1–6 and the corresponding flow control valves 21,26 or the corresponding valve blocks $B_{23}$,$B_{45}$ as opposed to the arrangement of the pressure sensors 61–64 on the corresponding pressurized fluid lines between the flow control valves 21,26,231–234,451–454 and the tank T in the pressure detection means illustrated in FIG. 1. The remaining construction is substantially the same as that shown in FIG. 1 and its description is hence omitted herein.

Figure 10:
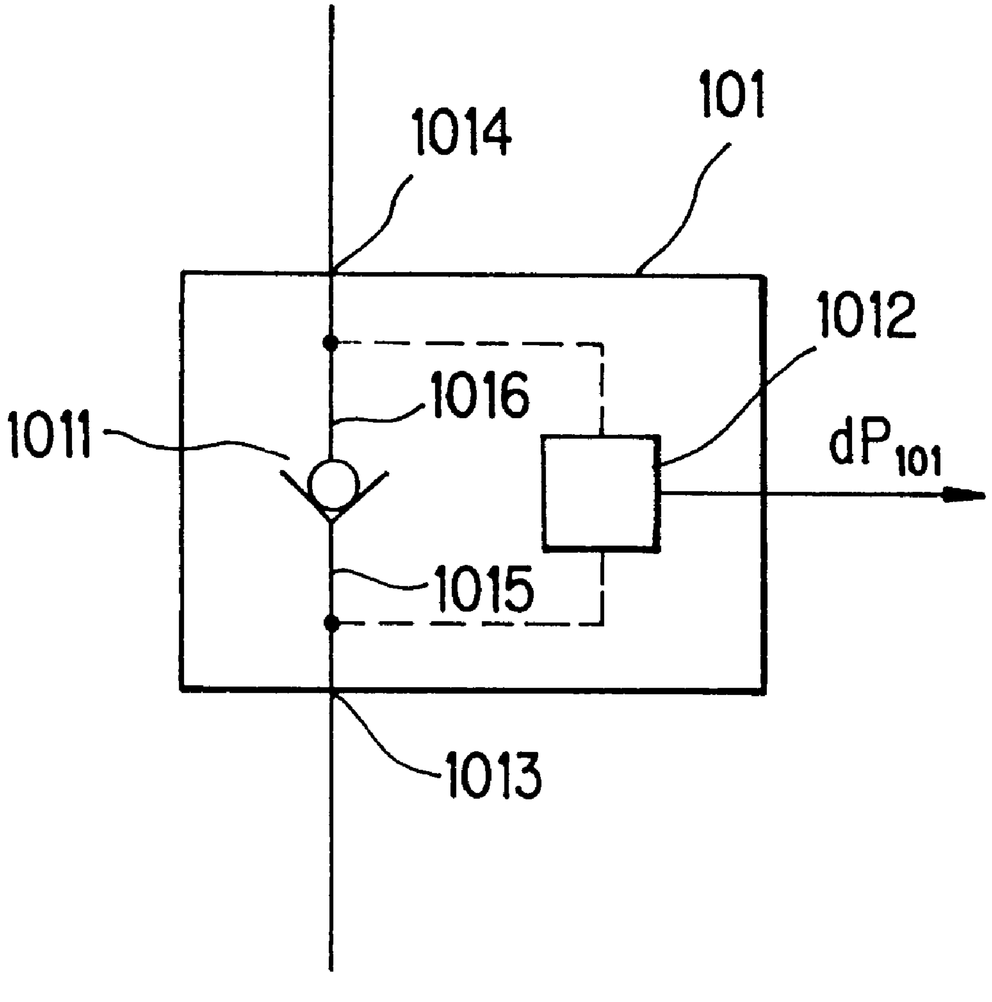
FIG. 10 is a diagram illustrating the construction of a check valve which is depicted in FIG. 9 and is equipped with a differential pressure sensor.

FIG. 10 is the diagram illustrating the construction of the DPS-equipped check valve 101 described above. The other DPS-equipped check valves have the same construction so that their description is omitted herein. In FIG. 10, numeral 1011 indicates a check valve communicated to the hydraulic pump 1 and numeral 1012 designates a differential pressure sensor adapted to detect a pressure difference developed across the check valve. In general, the check valve has a poppet pressed against a seat surface by a spring, pressurized fluid from the hydraulic pump acts on a pump-side surface 1015 of the poppet. When the thus-acting force is greater than the sum of the spring force and force acting on an outlet-side surface 1016, the poppet is caused to separate from the seat surface so that the pressurized fluid enters through an inlet port 1013, flows through a clearance formed over the seat surface and then flows out through an output port 1014. At this time, the pressure difference (differential pressure) across the check valve 1011 (between the inlet port 1013 and the outlet port 1014) varies depending on the flow rate of the passing pressurized fluid. The differential pressure sensor 1012 detects the differential pressure $dP_{101}$ and outputs the same. In FIG. 9, detection signals of the individual DPS-equipped check valves 101–106 are indicated by signs $dP_{101}$–$dP_{106}$.

Figure 11:
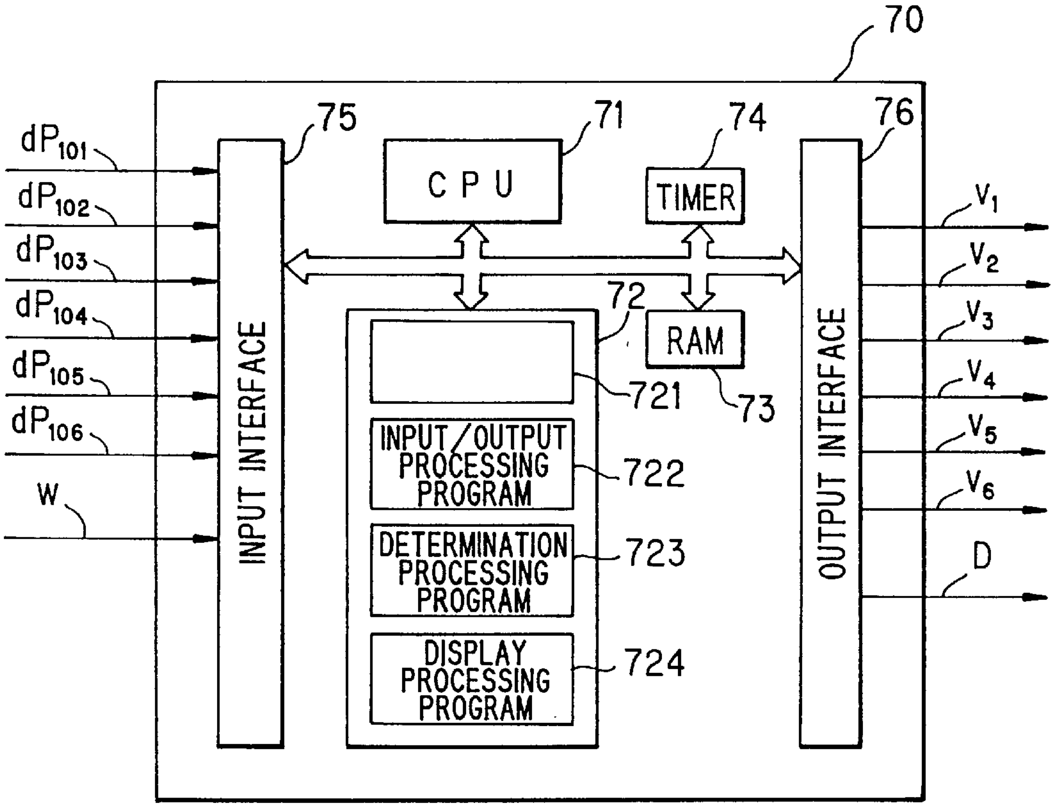
FIG. 11 is a system configuration diagram of a processor depicted in FIG. 9.

FIG. 11 is the system configuration diagram of a processor shown in FIG. 9. The processor 70 depicted in FIG. 11 is different from that shown in FIG. 3 in that the former processor performs input/output processing of the detection signals $dP_{101}$–$dP_{106}$ detected by the DPS-equipped check valves 101–106 whereas the latter processor performs the input/output processing of the detection signals $dP_{61}$–$dP_{64}$ detected by the pressure sensors 61–64. The remaining construction is substantially the same as that of the processor shown in FIG. 3, and its description is hence omitted herein.

Figure 12:
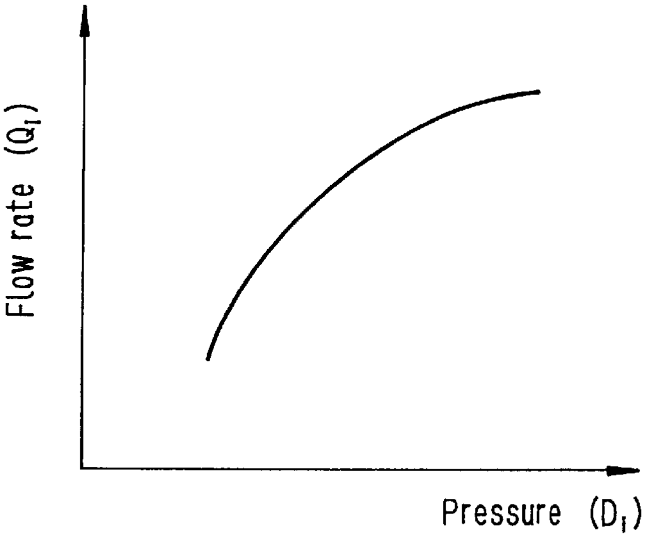
FIG. 12 is a characteristic diagram of a translation table between detection pressures of the differential pressure sensor of each check valve, which is depicted in FIG. 9 and is equipped with the differential pressure sensor, and flow rates.

FIG. 12 is the diagram showing the translation table stored in the area 721 of ROM 72 depicted in FIG. 11. In this diagram, detection pressures of each of the DPS-equipped check valves 101–106 shown in FIG. 9 are plotted along the abscissa, while their corresponding flow rates are plotted along the ordinate. This translation table can be prepared as will be described next. Namely, all the flow control valves are brought into neutral positions, and pressurized fluid is then allowed to pass through the individual DPS-equipped check valves 101–106 to measure a relationship between flow rates and differential pressures. The thus-obtained data are then prepared into the form of a table. When a translation table is prepared in this manner, a fault diagnosis is performed by setting the delivery flow rate of the hydraulic pump at the maximum flow rate as will be described subsequently herein so that it is sufficient for the translation table to define a flow rate-pressure relationship only in a large flow rate range. Further, when all the hydraulic pumps shown in FIG. 9 are new, it is also possible to prepare a translation table by plotting a point on the basis of a rated flow rate of the hydraulic pumps and a differential pressure and then using the point and an orifice or pressurized fluid line resistance which is known beforehand.

Figure 13:
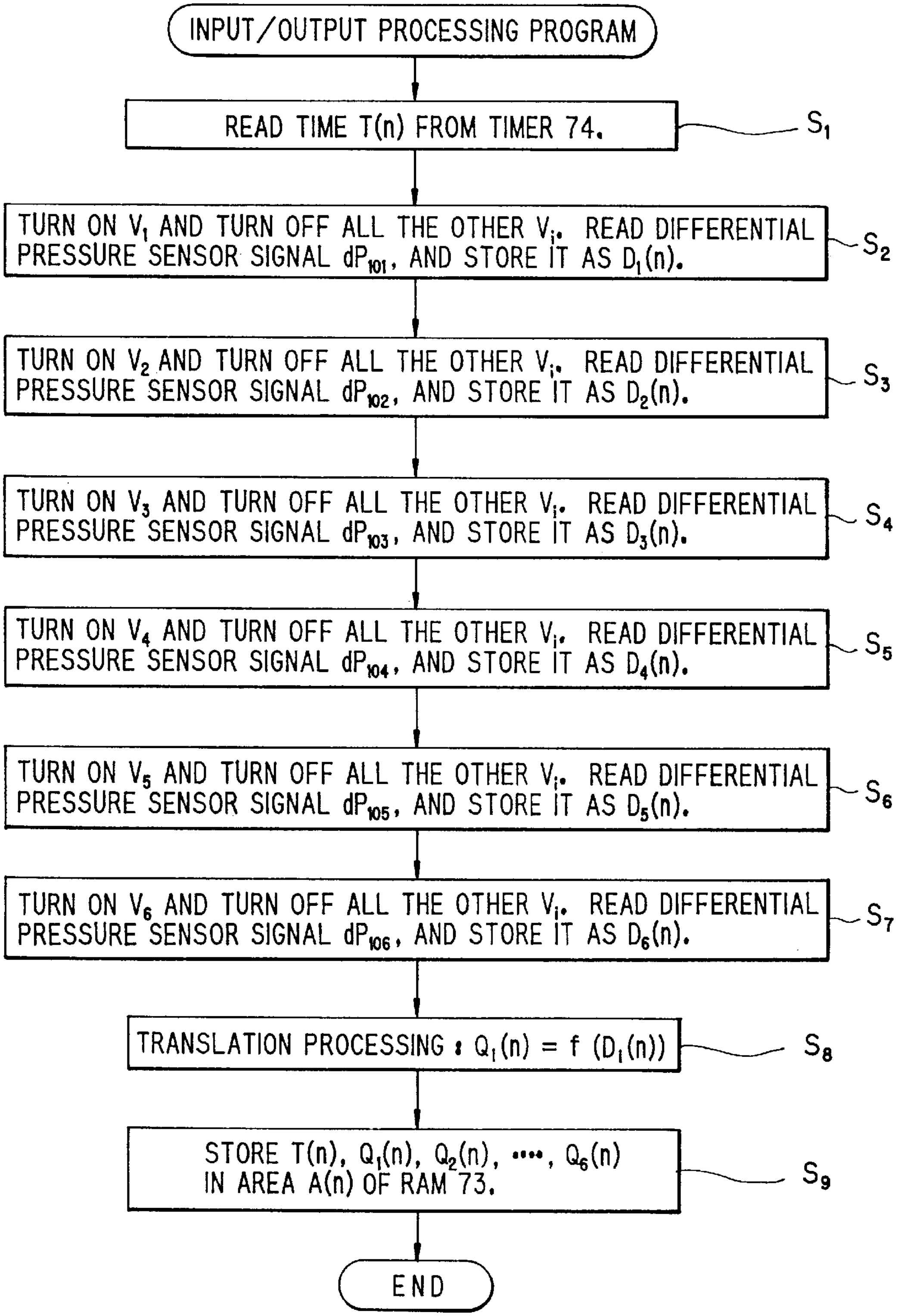
FIG. 13 is a flow chart illustrating an operation by the processor depicted in FIG. 9.

Next, operation of this embodiment will be described with reference to the flow chart shown in FIG. 13. A fault diagnosis can be performed at any time by turning on the switch 80. The operation of the switch 80 is performed, for example, at the end of work or before the shift to the next operator as in the first embodiment. Upon operation of the switch, the switch 80 is turned on with the speed of the engine as the motor maintained at a maximum level and also with all the control levers set in neutral positions. As a consequence, a signal w from the switch 80 is read in CPU 71 via the input interface 75 of the processor 70 and the input/output processing program stored in the area 722 of ROM 72 is activated firstly. Processing steps of this input/output processing program will be described with reference to FIG. 13.

Firstly, CPU 71 reads a current time T(n) from the timer 74 (step $S_1$). Incidentally, n represents the number of processings in step $S_1$. CPU 71 then turns on a signal $V_1$ for the solenoid-operated directional control valve 51 and turns off signals for the other solenoid-operated directional control valves 52–56. As a result, the solenoid-operated directional control valve 51 is switched into the lower position, a pressure of the pilot pump 7 is introduced into the control signal input port of the regulator 11, the swash plate 1*a* undergoes a maximum tilting, and the delivery flow rate of the hydraulic pump 1 reaches a maximum flow rate. Accordingly, the differential pressure across the check valve 1011 of the DPS-equipped check valve 101 increases and this pressure is detected by the differential pressure sensor 1012. CPU 71 reads a signal $dP_{101}$ of the differential pressure sensor 1012 and stores it in RAM 73 as pressure data $D_1(n)$ for the maximum flow rate of the hydraulic pump 1 (step $S_2$).

Next, CPU 71 turns on a signal $V_2$ for the solenoid-operated directional control valve 52 and turns off signals for the other solenoid-operated directional control valves 51,53–56. As a result, the solenoid-operated directional control valve 51 returns into the upper position and the solenoid-operated directional control valve 52 is switched into the lower positions, a pressure of the pilot pump 7 is introduced into the control signal input port of the regulator 12, the swash plate 2*a* undergoes a maximum tilting, and the delivery flow rate of the hydraulic pump 2 reaches a maximum flow rate. CPU 71 then stores a signal $dP_{102}$ of the differential pressure sensor of the DPS-equipped check valve 102 at this time as pressure data $D_2(n)$ for the maximum flow rate of the hydraulic pump 2 in RAM 73 (step $S_3$). Exactly the same processing is performed with respect to the hydraulic pumps 3–6 (steps $S_4$–$S_7$)

Next, CPU 71 translates the respective pressure data $D_i(n)$ (i=1–6) into their corresponding flow rates $Q_i(n)$ (i=1–6) by using the translation table shown in FIG. 12 and stored in the area 721 of ROM 72 (step $S_8$), and then stores the time T(n) and the respective flow rate $Q_1$–$Q_6$ in the area A(n) of RAM 73 (step $S_9$), whereby the input/output processing program is ended.

In the processing of the step $S_8$, each pressure was translated into its corresponding flow rate in accordance with the translation table stored in advance. It is however not absolutely necessary to rely upon such a translation table. Although the accuracy may be lowered somewhat, a flow rate corresponding to each pressure may be determined by performing the following operation instead of using the translation table.

$$Q_i = k_o \cdot D_i$$

where $k_o$ is a predetermined factor.

When the input/output processing program is ended, the determination processing program stored in the area 723 of ROM 72 is next activated. Processing steps of this determination processing program are the same as those in the first embodiment illustrated in FIG. 6 so that their description is omitted herein.

Upon ending the processing by the determination processing program, the display processing program stored in the area 724 of ROM 72 is next activated. A processing step of this display processing program is the same as that in the first embodiment illustrated in FIG. 7 so that its description is omitted herein.

The results of the display processing are outputted to the display 90. Details of a display by the display are similar to those in the first embodiment depicted in FIG. 8 so that their description is omitted herein.

As has been described above, according to this embodiment, the DPS-equipped check valves are interposed between the individual hydraulic valves and their corresponding flow control valves, and by operating the determination start switch, the delivery rate of one of the hydraulic pumps is set at the maximum flow rate and the flow rates of all the other hydraulic pumps are set at the minimum flow rates, whereby a differential pressure detected by the DPS-equipped check valve corresponding to the one hydraulic pump is collected. This differential pressure is then translated into a corresponding flow rate. These procedures are performed with respect to all the hydraulic pumps. The flow rates so collected in every determination are stored, and the flow rates obtained in the current determination are each compared with (1) the average value of the flow rates of the same hydraulic pump over the past long time, (2) the flow rate in the preceding determination, and (3) the average value of the flow rates of the hydraulic pumps of the same displacement in the current determination. It is therefore possible to surely perform a fault diagnosis with respect to each of the hydraulic pumps even when these hydraulic pumps are those of a work vehicle exposed to large vibrations and plural ones of the hydraulic pumps are used in combination.

Further, each component can be used until shortly before the end of its service life. The efficiency of use of each component can therefore be improved, so that the system of this embodiment is extremely economical.

In addition, the accuracy of a determination can be made higher by repeating fault diagnoses in accordance with the present embodiment and accumulating data. It is hence possible to preview a fault at a stage substantially before the fault would otherwise occur, thereby making it possible to avoid the fault in advance.

Incidentally, this embodiment was described based on the example in which differential pressures across the individual DPS-equipped check valves were collected by successively switching the solenoid-operated directional control valves. As an alternative, individual differential pressures may also be collected by simultaneously switching all the hydraulic pumps with one solenoid-operated directional control valve. In this case, the switching of the solenoid-operated directional control valves is obviated so that the time required for a determination can be shortened. When such a method is adopted, the pressurized fluid from each hydraulic pump returns to the tank through the corresponding flow control valve alone. Although torques absorbed in the individual hydraulic pumps are small, the sum of the individual torques is loaded on the engine. There is accordingly a potential problem that the speed of the engine is slightly lowered and the hydraulic pumps are hence lowered in speed and also in maximum flow rate. Nonetheless, this method may still be adopted if effects of the lowered maximum flow rates are small.

The solenoid-operated directional control valves were employed in this embodiment. A fault diagnosis is however feasible without using such solenoid-operated directional control valves. Described specifically, the delivery flow rate of any desired one of the hydraulic pumps can be increased close to its maximum flow rate by selectively operating the corresponding control lever and operating the corresponding specific hydraulic actuator in a particular position. When the boom, arm and bucket are operated, for example, in a downward direction, a crowding direction and a crowding direction, respectively, from a position with the boom raised, the arm extended and the bucket dumped, all the determination processings can be performed with respect to the hydraulic pumps 2,3,4,5 by collecting differential pressure signals under similar conditions as in the preceding embodiment. In this case, the feasibility of operation in a region where the pressure $P_o$ is not controlled as viewed in FIG. 2 is needed as a premise. Even if a loaded pressure is so large that it falls within a region of constant torque control higher than the pressure $P_o$, processing by the third determination reference value is still effective and, insofar as operation is always performed carefully in the same position with a view to achieving good reproducibility, processings by the first and second determination reference values can also be rendered effective with selection of slightly greater reference values although the accuracy may be lowered somewhat. On the other hand, the hydraulic pumps 1,6 are arranged for the swing motor and, when the corresponding control lever is operated over a maximum stroke, the hydraulic pumps are driven definitely within the region of constant torque control shown in FIG. 2. Even in this case, processing by the third determination reference value is still effective.

In the above description of this embodiment, the hydraulic excavator was described by taking it as an example.

Needless to say, the above embodiment can also be used for the fault diagnosis of hydraulic pumps in a work vehicle other than such a hydraulic excavator. Further, the description was made about the example in which one or more differential pressures detected by one or more DPS-equipped check valves were translated into one or more flow rates and a fault determination was performed based on the one or more flow rates. The translation of each differential pressure into a flow rate is however not absolutely needed, and a differential pressure detected by each DPS-equipped check valve may also be used as is.

Further, transmission of the thus-obtained data to a supervision center of work vehicles makes it possible to perform a fault diagnosis at the supervision center instead of by the operator of the work vehicle.

In the above description of this embodiment, the description was made about the example in which how much the current value of each hydraulic pump was deviated from the three determination reference values, respectively, were displayed. It is however also possible display the results of a comparison with the reference values or to display by using lamps or the like.

According to the above description, the determination was performed at the end of every 8-hour shift by way of example. Without being limited to such an example, the determination can be performed at any time by setting the engine at a maximum speed or at a speed close to the maximum speed, bringing all the control levers into neutral positions, and operating the switch 80.

It is also possible to insert a small restrictor either upstream or downstream of each check valve at a point between two connecting points of the corresponding differential pressure sensor so that the pressure in the associated pressurized fluid line can be increased there.

Further, even when any one of hydraulic pumps develops a fault in such a large hydraulic excavator as each hydraulic actuator is driven by combining pressurized fluids delivered from two of its hydraulic pumps, the fault-developed hydraulic pump can be promptly identified.

Capability of Exploitation in Industry

As has been described above, according to one of the inventions, a pressure sensor is arranged on a pressurized fluid line communicating at least one hydraulic pump to a tank through at least one flow control valve set in a neutral position, all flow control valves are brought into neutral positions, and the delivery flow rate of one of the hydraulic pumps is set at a maximum flow rate to collect a detection value of a pressure sensor corresponding to the one hydraulic pump (optionally, the detection value is translated into a flow rate). These procedures are performed with respect to all the hydraulic pumps. Individual detection values (flow rates) collected in every determination as described above are stored. Based on the detection values (flow rates), a determination is performed as to whether each hydraulic pump is in order or out of order. It is therefore possible to surely perform a fault diagnosis with respect to each of the hydraulic pumps even if the hydraulic pumps are those of a work vehicle exposed to large vibrations and plural ones of the hydraulic pumps are used in combination.

Further, the pressure sensors are arranged on the pressurized fluid lines through which working fluid is discharged to the tank so that pressure sensors for low pressures are sufficient. Coupled with the obviation of flow meters, the system can be constructed at low cost.

According to the other invention, on the other hand, a check valve equipped with a differential pressure sensor is interposed between each hydraulic pump and its corresponding flow control valve. By setting the delivery rates of hydraulic pumps at maximum flow rates, a detection differential pressure across the DPS-equipped check valve corresponding to each hydraulic pump is collected (optionally, the detection differential pressure is translated into a flow rate). Individual differential pressures (or flow rates) so collected in every determination are stored. Based on the detection values (or flow rates), a determination is performed as to whether each hydraulic pump is in order or out of order. It is therefore possible to surely perform a fault diagnosis with respect to each of the hydraulic pumps even if the hydraulic pumps are those of a work vehicle exposed to large vibrations and plural ones of the hydraulic pumps are used in combination.

Even when one of hydraulic pumps develops a fault in such a large work vehicle as each hydraulic actuator is driven by combining pressurized fluids delivered from two of the hydraulic pumps, the fault-developed hydraulic pump can be promptly identified.

Compared with the method that each component is replaced upon expiration of its predetermined use time, both of the above inventions makes it possible to use each component until shortly before the end of its service life. The efficiency of use of each component can therefore be improved, so that both of the inventions are extremely economical.

In addition, the accuracy of a determination can be made higher by repeating fault diagnoses in accordance with the present embodiment and accumulating data. It is hence possible to preview a fault at a stage substantially before the fault would otherwise occur, thereby making it possible to avoid the fault in advance.

What is claimed is:

1. A fault diagnosis system for hydraulic pumps in a work vehicle, said work vehicle being provided with a plurality of variable displacement hydraulic pumps as said hydraulic pumps, delivery rates of which are controlled by regulators, a plurality of hydraulic actuators each of which is driven by pressurized fluid delivered from at least one of said variable displacement hydraulic pumps, a plurality of flow control valves for controlling driving of said individual hydraulic actuators, and a pressurized fluid line for communicating said at least one variable displacement hydraulic pump to a tank via at least one of said flow control valves, said at least one flow control valve being in a neutral position thereof, wherein said fault diagnosis system comprises a pressure sensor arranged on said pressurized fluid line for detecting a fluid pressure in said pressurized fluid line, maximum delivery rate designation means for successively designating maximum delivery rates of said variable displacement hydraulic pumps to corresponding ones of said regulators while said at least one variable displacement hydraulic pump is maintained in communication with said pressurized fluid line, memory means for storing a detection value by said pressure sensor with respect to each of said variable displacement hydraulic pumps, said each variable displacement hydraulic pump delivering said pressurized fluid at said maximum flow rate designated by said maximum delivery rate designation means, and fault determination means for performing on a basis of detection values by said pressure sensor a determination as to whether said variable displacement hydraulic pump for which said maximum delivery rate has been designated is operating properly or not operating properly.

2. A fault diagnosis system for hydraulic pumps in a work vehicle, said work vehicle being provided with a plurality of variable displacement hydraulic pumps as said hydraulic pumps, delivery rates of which are controlled by regulators, a plurality of hydraulic actuators each of which is driven by pressurized fluid delivered from at least one of said variable displacement hydraulic pumps, a plurality of flow control valves for controlling driving of said individual hydraulic actuators, and a pressurized fluid line for communicating said at least one variable displacement hydraulic pump to a tank via at least one of said flow control valves, said at least one flow control valve being in a neutral position thereof, wherein said fault diagnosis system comprises a pressure sensor arranged on said pressurized fluid line for detecting a fluid pressure in said pressurized fluid line, maximum delivery rate designation means for successively designating maximum delivery rates of said variable displacement hydraulic pumps to corresponding ones of said regulators while said at least one variable displacement hydraulic pump is maintained in communication with said pressurized fluid line, pressure-flow rate translation means for translating a detection value by said pressure sensor with respect to each of said variable displacement hydraulic pumps, said each variable displacement hydraulic pump delivering said pressurized fluid at said maximum flow rate designated by said maximum delivery rate designation means, memory means for storing a flow rate translated by said pressure-flow rate translation means, and fault determination means for performing on a basis of flow rates translated by said pressure-flow rate translation means a determination as to whether said variable displacement hydraulic pump for which said maximum delivery rate has been designated is operating properly or not operating properly.

3. The fault diagnosis system according to claim 1 or 2, wherein with respect to the same one of said variable displacement hydraulic pumps, said fault determination means performs a comparison between an average value of past detection values and a current detection value by the corresponding pressure sensor or a comparison between an average value of past translated flow rates and a current translated flow rate by said pressure-flow rate translation means.

4. The fault diagnosis system according to claim 1 or 2, wherein with respect to the same one of said variable displacement hydraulic pumps, said fault determination means performs a comparison between a preceding detection value and a current detection value by the corresponding pressure sensor or a comparison between a preceding translated flow rates and a current translated flow rate by said pressure-flow rate translation means.

5. The fault diagnosis system according to claim 1 or 2, wherein with respect to plural ones of said variable displacement hydraulic pumps, said plural variable displacement hydraulic pumps having the same displacement, said fault determination means performs a comparison between an average value of current detection values of the corresponding pressure sensors and a current detection value of each of the corresponding pressure sensors or a comparison between an average value of current translated flow rates and a current translated flow rate by said pressure-flow rate translation means.

6. A fault diagnosis system for hydraulic pumps in a work vehicle, said work vehicle being provided with a plurality of variable displacement hydraulic pumps as said hydraulic pumps, delivery rates of which are controlled by regulators, a plurality of hydraulic actuators each of which is driven by pressurized fluid delivered from at least one of said variable displacement hydraulic pumps, a plurality of flow control valves for controlling driving of said individual hydraulic actuators, and a pressurized fluid line for communicating said at least one variable displacement hydraulic pump to a tank via at least one of said flow control valves, said at least one flow control valve being in a neutral position thereof, wherein said fault diagnosis system comprises check valves provided with differential pressure sensors and interposed between said respective variable displacement hydraulic pumps and corresponding ones of said flow control valves, maximum delivery rate designation means for designating maximum delivery rates of said variable displacement hydraulic pumps to corresponding ones of said regulators while said at least one variable displacement hydraulic pump is maintained in communication with said pressurized fluid line, memory means for storing a pressure detected by said check valve provided with said differential pressure sensor with respect to each of said variable displacement hydraulic pumps, said each variable displacement hydraulic pump delivering said pressurized fluid at said maximum flow rate designated by said maximum delivery rate designation means, and fault determination means for performing on a basis of said detection values a determination as to whether said variable displacement hydraulic pump for which said maximum delivery rate has been designated is operating properly or not operating properly.

7. A fault diagnosis system for hydraulic pumps in a work vehicle, said work vehicle being provided with a plurality of variable displacement hydraulic pumps as said hydraulic pumps, delivery rates of which are controlled by regulators, a plurality of hydraulic actuators each of which is driven by pressurized fluid delivered from at least one of said variable displacement hydraulic pumps, a plurality of flow control valves for controlling driving of said individual hydraulic actuators, and a pressurized fluid line for communicating said at least one variable displacement hydraulic pump to a tank via at least one of said flow control valves, said at least one flow control valve being in a neutral position thereof, wherein said fault diagnosis system comprises check valves provided with differential pressure sensors and interposed between said respective variable displacement hydraulic pumps and corresponding ones of said flow control valves, maximum delivery rate designation means for designating maximum delivery rates of said variable displacement hydraulic pumps to corresponding ones of said regulators while said at least one variable displacement hydraulic pump is maintained in communication with said pressurized fluid line, pressure-flow rate translation means for translating a detection value by said pressure sensor provided with said differential pressure sensor with respect to each of said variable displacement hydraulic pumps, said each variable displacement hydraulic pump delivering said pressurized fluid at said maximum flow rate designated by said maximum delivery rate designation means, memory means for storing a translated flow rate said pressure-flow rate translation means, and fault determination means for performing on a basis of said detected pressure a determination as to whether said variable displacement hydraulic pump for which said maximum delivery rate has been designated is operating properly or not operating properly.

8. The fault diagnosis system according to claim 6 or 7, wherein with respect to the same one of said variable displacement hydraulic pumps, said fault determination means performs a comparison between an average value of past detected pressures and a current detected pressure or a comparison between an average value of past translated flow rates and a current translated flow rate by said pressure-flow rate translation means.

9. The fault diagnosis system according to claim 6 or 7, wherein with respect to the same variable displacement hydraulic pump, said fault determination means performs a comparison between a preceding detected pressure and a current detected pressure or a comparison between a preceding translated flow rate and a current translated flow rate by said pressure-flow rate translation means.

10. The fault diagnosis system according to claim 6 or 7, wherein with respect to plural ones of said variable displacement hydraulic pumps, said plural variable displacement hydraulic pumps having the same displacement, said fault determination means performs a comparison between an average value of current detection values of the corresponding pressure sensors and a current detection value of each of the corresponding pressure sensors or a comparison between an average value of current translated flow rates and a current translated flow rate by said pressure-flow rate translation means.

* * * * *